(12) United States Patent
Yun

(10) Patent No.: US 8,566,025 B2
(45) Date of Patent: Oct. 22, 2013

(54) METHOD OF SELECTING ROUTE AND TERMINAL USING THE SAME

(75) Inventor: Kyungso Yun, Pyeongtaek-si (KR)

(73) Assignee: LG Electronics Inc., Seoul (KR)

( * ) Notice: Subject to any disclaimer, the term of this patent is extended or adjusted under 35 U.S.C. 154(b) by 869 days.

(21) Appl. No.: 12/000,288

(22) Filed: Dec. 11, 2007

(65) Prior Publication Data

US 2008/0275640 A1 Nov. 6, 2008

Related U.S. Application Data

(60) Provisional application No. 60/915,221, filed on May 1, 2007.

(30) Foreign Application Priority Data

Jun. 27, 2007 (KR) .................. 10-2007-0063967

(51) Int. Cl.
*H04M 3/42* (2006.01)
*G06F 17/00* (2006.01)
*G06F 19/00* (2011.01)
*G01C 21/26* (2006.01)
*G08G 1/123* (2006.01)

(52) U.S. Cl.
USPC ........... 701/411; 701/414; 701/423; 701/451; 340/995.13; 455/414.2

(58) Field of Classification Search
USPC ............ 701/117, 119, 200–202, 207–210, 1, 701/36, 400, 408, 409, 410, 411, 414, 416, 701/418, 423, 424, 425, 451, 465, 487, 522, 701/532, 537, 538; 340/988, 989, 340/995.12–995.14; 455/414.2, 414.3
See application file for complete search history.

(56) References Cited

U.S. PATENT DOCUMENTS

| | | |
|---|---|---|
| 3,582,620 A | 6/1971 | Noetinger |
| 3,626,413 A | 12/1971 | Zachmann |
| 4,866,438 A | 9/1989 | Knisch |
| 4,985,705 A | 1/1991 | Stammler |
| 5,289,183 A | 2/1994 | Hassett et al. |
| 5,337,082 A | 8/1994 | Fredericks |

(Continued)

FOREIGN PATENT DOCUMENTS

| | | |
|---|---|---|
| EP | 1600910 A2 | 11/2005 |
| EP | 1612517 A1 | 1/2006 |

(Continued)

*Primary Examiner* — Thomas Tarcza
*Assistant Examiner* — Edward Pipala
(74) *Attorney, Agent, or Firm* — Birch, Stewart, Kolasch & Birch, LLP

(57) ABSTRACT

A method of selecting a travel route, which includes receiving message information formed in a hierarchical structure and including traffic information, receiving a first position value and a second position value corresponding to first and second positions, searching for travel routes between the first and second positions, dividing the travel routes from the first position to the second position into a plurality of individual road links, calculating a time required to travel each road link along the travel routes from the first position to the second position based on at least one of current traffic congestion status information and prediction traffic congestion status information, and calculating a total time required to travel all of the road links for the travel routes from the first position to the second position.

20 Claims, 9 Drawing Sheets

(56) References Cited

U.S. PATENT DOCUMENTS

| | | | |
|---|---|---|---|
| 5,465,289 A | 11/1995 | Kennedy, Jr. | |
| 6,882,930 B2 | 4/2005 | Trayford et al. | |
| 6,922,629 B2 | 7/2005 | Yoshikawa et al. | |
| 7,197,500 B1 | 3/2007 | Israni et al. | |
| 7,375,649 B2 * | 5/2008 | Gueziec | 340/905 |
| 7,617,043 B2 * | 11/2009 | Zhao et al. | 701/201 |
| 7,831,380 B2 | 11/2010 | Chapman et al. | |
| 7,925,426 B2 | 4/2011 | Koebler et al. | |
| 2003/0135383 A1 * | 7/2003 | Mizuno | 705/1 |
| 2004/0034464 A1 | 2/2004 | Yoshikawa et al. | |
| 2004/0038671 A1 | 2/2004 | Trayford et al. | |
| 2004/0073361 A1 | 4/2004 | Tzamaloukas et al. | |
| 2005/0090976 A1 | 4/2005 | Beesley et al. | |
| 2005/0131641 A1 | 6/2005 | Beesley et al. | |
| 2006/0089787 A1 | 4/2006 | Burr et al. | |
| 2007/0010942 A1 | 1/2007 | Bill | |
| 2007/0019562 A1 * | 1/2007 | Kim et al. | 370/252 |
| 2007/0150185 A1 | 6/2007 | Nagase et al. | |
| 2007/0198179 A1 | 8/2007 | Ishikawa | |
| 2007/0208498 A1 | 9/2007 | Barker et al. | |
| 2007/0290839 A1 | 12/2007 | Uyeki et al. | |
| 2008/0010002 A1 * | 1/2008 | DeKock et al. | 701/117 |
| 2008/0071465 A1 | 3/2008 | Chapman et al. | |
| 2008/0275639 A1 * | 11/2008 | Yun | 701/202 |

FOREIGN PATENT DOCUMENTS

| | | |
|---|---|---|
| KR | 10-1999-0068262 A | 9/1999 |
| KR | 10-2003-0022161 A | 3/2003 |
| KR | 10-2003-0041157 A | 5/2003 |
| KR | 10-2004-0050459 A | 6/2004 |
| WO | WO 2006/123888 A1 | 11/2006 |
| WO | WO 2007/042796 A1 | 4/2007 |

* cited by examiner

METHOD OF SELECTING ROUTE AND TERMINAL USING THE SAME

The present application claims priority under 35 U.S.C. §119 to Korean Patent Application No. 10-2007-63967 filed in Republic of Korea on Jun. 27, 2007, the entire contents of which are hereby incorporated by reference. The present application also claims priority under 35 U.S.C. §120 to U.S. Provisional Application No. 60/915,221, filed on May 1, 2007, the entire contents of which is hereby incorporated by reference.

BACKGROUND OF THE INVENTION

1. Field of the Invention

This present invention relates to a method and corresponding terminal for selecting an optional travel route.

2. Discussion of the Background

Today, traffic congestion is a serious problem. Many people often spend more than an hour each day commuting back and forth to work. Thus, many automobile manufactures now include navigation systems included with the automobile. Portable navigation systems are also available.

In more detail, the navigation system includes a Global Positioning System (GPS) receiver that receives a navigation message transmitted from a GPS satellite. The navigation system also includes a gyroscope, a speed sensor and a control unit that are used to determine the current position of the vehicle and display a map or directions to a destination point desired by a user. The user can then view the map to get to their destination.

Further, many broadcasting networks now provide traffic information. That is, a broadcasting station broadcasts traffic information using a Transport Protocol Expert Group (TPEG) standard and a Digital Multimedia Broadcast (DMB) transmission standard.

However, the related art navigation system using the TPEG standard selects a travel route using a preset travel time, but does not provide a real time analysis of the traffic conditions while the vehicle is traveling. Thus, the map provided by the navigation system does not include the best route to take based on the current road conditions (e.g., congestion, weather, etc).

SUMMARY OF THE INVENTION

Accordingly, one object of the present invention is to address the above-noted and other problems.

Another object of the present invention is to provide a method and corresponding terminal that selects the best available travel route based at least one of current traffic congestion status information and prediction traffic congestion status information.

To achieve these and other advantages and in accordance with the purpose of the present invention, as embodied and broadly described herein, the present invention provides in one aspect a method of selecting a travel route, which includes receiving message information formed in a hierarchical structure and including traffic information, receiving a first position value and a second position value corresponding to first and second positions, searching for travel routes between the first and second positions, dividing the travel routes from the first position to the second position into a plurality of individual road links, calculating a time required to travel each road link along the travel routes from the first position to the second position based on at least one of current traffic congestion status information, and prediction traffic congestion status information and calculating a total time required to travel all of the road links for the travel routes from the first position to the second position In another aspect, the present invention provides a navigation terminal including a receiving unit configured to receive message information formed in a hierarchical structure and including traffic information, an input unit configured to receive a first position value and a second position value corresponding to first and second positions, and a control unit configured to search for travel routes between the first and second positions, to divide the travel routes from the first position to the second position into a plurality of individual road links, to calculate a time required to travel each road link along the travel routes from the first position to the second position based on at least one of current traffic congestion status information and prediction traffic congestion status information, and to calculate a total time required to travel all of the road links for the travel routes from the first position to the second position.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein.

DETAILED DESCRIPTION OF THE INVENTION

Reference will now be made in detail to the preferred embodiments of the present invention, examples of which are illustrated in the accompanying drawings.

Figure 1:
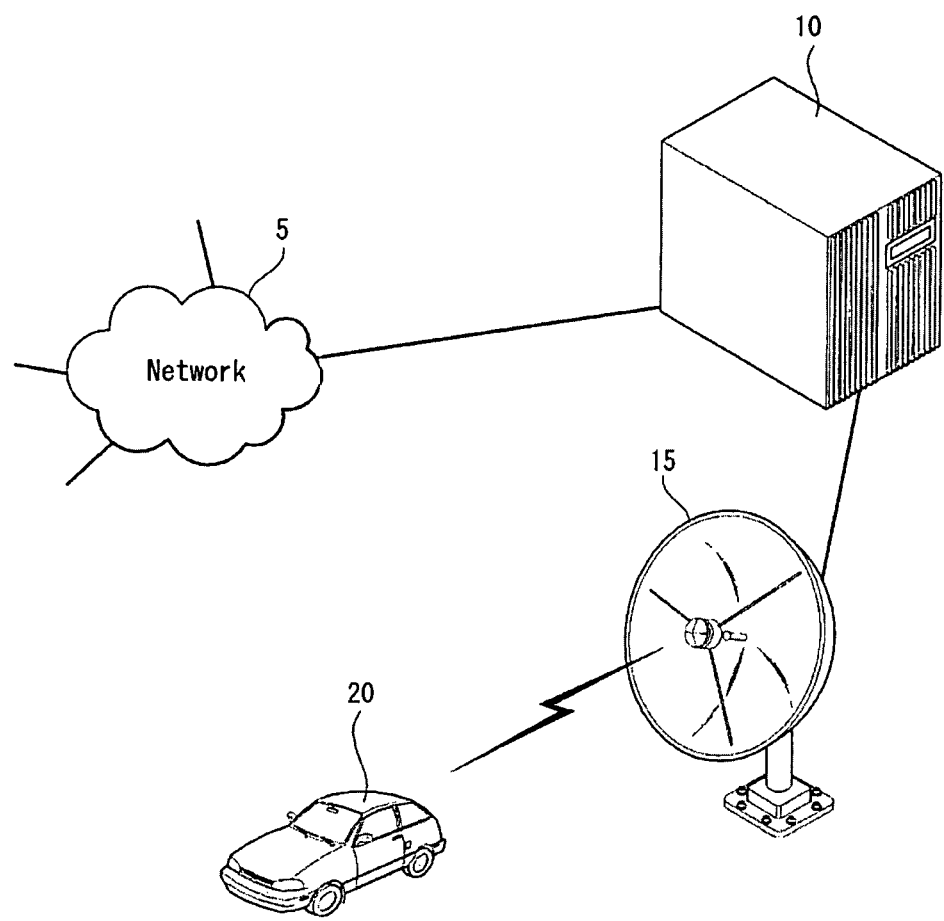
FIG. 1 is an overview illustrating a traffic information providing system according to an embodiment of the present invention.

First, FIG. 1 is an overview illustrating a traffic information providing system according to an embodiment of the present invention. As shown in FIG. 1, the traffic information providing system includes a network 5, a traffic information providing server 10, a broadcasting station 15 and a vehicle 20.

The network 5 includes wired and wireless communication networks such as a Local Area Network (LAN) and a Wide Area Network (WAN). Further, various traffic information is collected through the network 5, and the collected information is processed in a format to be described later in the traffic information providing server 10 and is transmitted to the broadcasting station 15. The broadcasting station 15 inserts the processed traffic information into a broadcasting signal and broadcasts the broadcasting signal to the vehicle 20.

In addition, the traffic information providing server 10 reconstitutes traffic information collected from a variety of sources such as an operator's input, wired and wireless Internet, a digital broadcasting service such as a Transparent Data Channel (TDC) and a Multimedia Object Transport (MOC), another server or a probe car in a traffic information format such as the format according to the TPEG standard (the standard for traffic information service). The server 10 also sends the reconstituted traffic information to the broadcasting station 15, and the broadcasting station 15 broadcasts the traffic information using a broadcasting signal. A navigation device mounted in the vehicle 20 may then receive the broadcasted information.

Further, the broadcasted traffic information includes information about various traffic conditions corresponding to a road (for automobiles), the ocean (for watercraft), and an airline service (for airplanes). For example, the traffic information may include information about an accident, a road status, traffic congestion, road construction, road closure, delay of a public traffic network, delay of an airline service, police activity in a particular area, etc.

The broadcasting station 15 receives the processed traffic information from the server 10 and transmits the received traffic information to the vehicle 20 through a digital signal according to various digital broadcasting standards. For example, the broadcasting standard may be a terrestrial or satellite DMB standard, terrestrial digital video broadcasting (DVB-T) standard, mobile digital video broadcasting-handheld (DVB-H) standard, Media Forward Link Only (MFLO) standard, and European digital audio broadcasting (DAB) standard based on Yureka-147 (ETSI EN 300 401). Further, the broadcasting station 15 transmits the traffic information through wired and wireless networks such as the wired and wireless Internet.

In addition, the vehicle 20 shown in FIG. 1 is an automobile. However, the vehicle 20 may be any other type of transportation vehicle such as a bus, a train, a ship, an airplane, etc. The following description assumes the vehicle 20 is an automobile.

Thus, the traffic information reception terminal mounted in the vehicle receives TPEG data from the broadcasting station 15, processes the received data, and outputs the processed data to a user using a display and/or audio.

Figure 2:
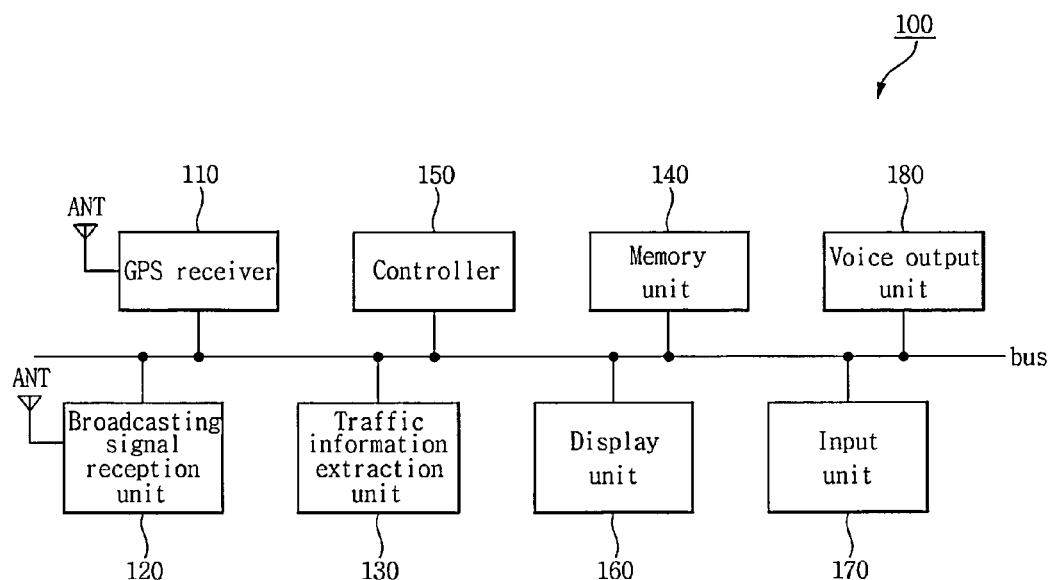
FIG. 2 is a block diagram illustrating a navigation terminal according to an embodiment of the present invention.

Next, FIG. 2 is a block diagram illustrating a traffic information reception terminal 100 according to an embodiment of the present invention. The traffic information reception terminal 100 may be classified as an in-dash type and an on-dash type. That is, the in-dash type traffic information reception terminal 100 is inserted into a predetermined space in the dash board of the vehicle 20 and is fixedly mounted. Further, the on-dash type traffic information reception terminal is provided on the dash board of the vehicle 20 (the terminal may be detachably attached to the dash board using a support member). Therefore, the on-dash type traffic information reception terminal can be detached from the vehicle 20 and carried. Thus, the on-dash type terminal is often referred to as a portable navigation device. The traffic information reception terminal 100 can also be a mobile terminal or any other terminal that can perform a navigation function.

As shown in FIG. 2, the traffic information reception terminal 100 includes a GPS receiver 110, a broadcasting signal reception unit 120, a traffic information extraction unit 130, a memory unit 140, a controller 150, a display unit 160, an input unit 170 and a voice output unit 180.

Further, the GPS receiver 100 receives a navigation message transmitted by the GPS satellite through an antenna ANT and provides the navigation message to the controller 150. Also, the broadcasting signal reception unit 120 receives a broadcasting signal including traffic information provided from the traffic information providing server 10 through the antenna ANT. The broadcasting signal received by the broadcasting signal reception unit 120 includes video and audio data according to various standards such as terrestrial or satellite DMB, DAB, and digital video broadcasting (DVB-T and DVB-H), traffic information according to a traffic information service and a Binary Format for Scene (BIFS) data service, and other various information.

Figure 3:
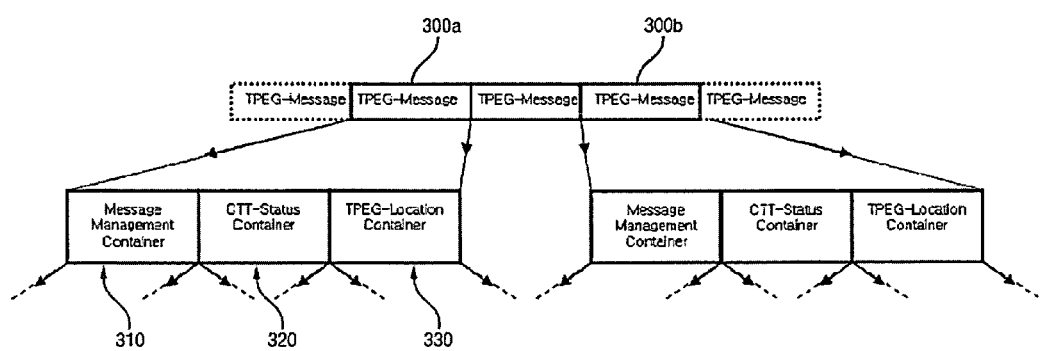
FIG. 3 is a protocol diagram illustrating a format of traffic information wirelessly transmitted according to an embodiment of the present invention.

Further, the broadcasting signal reception unit 120 synchronizes a signal band in which the traffic information is provided, demodulates the synchronized signal, and outputs the demodulated signal. The traffic information extraction unit 130 receives the demodulated signal output from the broadcasting signal reception unit 120 and decodes the message into a TPEG message sequence as shown in FIG. 3. The extraction unit 130 then analyzes each TPEG message within the sequence, and transmits traffic information and/or a control signal to the controller 150 based on the analyzed information. The controller 150 then stores the transmitted traffic information in the memory unit 140.

In addition, the memory unit 140 includes a non-volatile memory for storing a program used for performing various functions of the traffic information reception terminal 100, and a volatile memory for temporarily storing various data generated according to the operation of the traffic information reception terminal 100. The non-volatile memory also is used to store various data used for selecting an optimal route to reach a desired destination. For example, the memory unit 140 stores traffic information including a travel time and prediction travel time extracted from the traffic information extraction unit 130 in a lookup table form that is used when searching for an optimal route.

Further, the memory unit 140 stores map data the user can view to operate the vehicle 20 based on a navigation message received through the GPS receiver 110. The map data includes an intersection with another road or a road branch point such as an interchange, various geographical data such as a road link for connecting each branch point, a road link distance, geographical information, a map, etc.

In addition, when the traffic information reception terminal 100 does not store map data because of a limited memory capacity, various geographical data may be stored in the memory unit 140 in a text form. Further, a road link includes one or more road links that are used when traveling to a desired destination. A road link between branch points will also be referred to as a unit road link.

Also, a road link between a starting point and a destination may include a set of one or more unit road links. That is, a unit road link indicates a road link between branch points, and the vehicle 20 entering a unit road link cannot branch off to another road link until a next branch point appears.

Further, each road link in the map data is recognized by a link identifier. The link identifier can include, for example, the latitude and longitude of a starting point and an ending point of a link, a character, a numeral, or combination of characters and numerals such as a name of the link.

In addition, the controller 150 includes a processor for processing various data input to the traffic information reception terminal 100, and controls the overall operations of the traffic information reception terminal 100. Further, the controller 150 searches for map data including various positions corresponding to the vehicle 20 such as a current position, a starting point, and a destination point for the vehicle 20 from the memory unit 140 based on a navigation message received by the GPS receiver 110, and searches for all possible routes to the destination. Also, the controller 150 selects an optimum route using traffic information extracted from the traffic information extraction unit 130, and displays the selected route on the display unit 160.

In addition, the display unit 160 displays map data read from the memory unit 140 according to a navigation message received in the GPS receiver 110, a current position of the vehicle 20, traffic information, and a route of the vehicle 20 on a map, under the control of the controller 150. The display unit 160 may be a Liquid Crystal Display (LCD) and may include a touch screen. The display unit 160 also displays various functions provided by the traffic information reception terminal 100 in a menu structure form, and is used by the user to input or select a particular function displayed on the display unit 160.

The input unit 170 then receives the various operation instructions from the user and provides the various operation instructions to the controller 150. The input unit 170 includes at least one of a key input unit having numeral or function keys, a touch pad for inputting information, and a remote control unit installed in a steering wheel within the vehicle 20 for allowing the user to easily input information into the traffic information reception terminal 100.

Further, the voice output unit 180 generates an audio signal, amplifies the audio signal to a selected predetermined level that is set using the input unit 170, and outputs the amplified audio signal through one or more speakers (not shown).

Next, FIG. 3 is a diagram illustrating a format of transmitted traffic information. As shown in FIG. 3, the format includes sequence message segments (hereinafter, a message segment is referred to as a TPEG message). Further, a TPEG message 300a among the TPEG messages is applied to at least one application. For example, the TPEG message 300a may indicate a TPEG-congestion and travel-time information application (TPEG-CTT), and another TPEG message 300b may indicate a TPEG-public transport information application or a TPEG-road traffic message application including accident and unexpected status information.

Further, a unique identification number referred to as an Application Identifier (AID) is allocated to each TPEG application. The AID is used to decode the received TPEG message using the most suitable application decoder. The AID 0010 (hex) is allocated to the TPEG-CTT.

The TPEG-CTT is provided to road users and includes information that has an influence on using a road such as traffic information in a road network, congestion and a travel time. Further, as shown in FIG. 3, the TPEG message 300a including congestion and travel-time information message has a message management container 310, an application status container 320, and a TPEG-location container 330. The other TPEG messages include similar containers.

The application status container 320 is a TPEG-CTT container. Further, the contents of the application status container 320 change according to a type of the TPEG message application. In addition, as shown, the TPEG message 300b for transmitting other traffic information is included in the TPEG message sequence, and thus at least two applications may be included within one TPEG message stream.

In addition, the message management container 310 includes a message identifier (MID) and a version number (VER). Further, the message management container 310 may include a date and time element, and a message generation time. The elements included in the message management container 310 is used for managing information received in a TPEG decoder. However, unlike the other applications (accident and unexpected status information application and popular traffic information application) of the TPEG, in the congestion traffic information application related to a data and a time among elements of the message management container 310, a start time and an end time, a message elimination time, and schedule information are not transmitted. This is because unlike the unexpected status information to manage and transmit a message according to a changing status every moment, in the congestion traffic information, it is important to transmit a current traffic status at each point.

Further, the TPEG-CTT container 320 includes current traffic congestion status information and prediction traffic congestion status information for each road link. Also, in the container 320, the status information follows a hierarchical structure and assures terminal compatibility with an expanded standard or additional component.

Next, Table 1 shows a class of the TPEG-CTT container 320.

TABLE 1

| Class | Description |
|---|---|
| Congestion and travel time status CTT_Status | In a traffic network or a random road link, describe a traffic status of the vehicle |
| Prediction congestion and travel time status Prediction_CTT_Status | In a traffic network or a random road link, describe a prediction traffic status of the vehicle |
| Additional Information | Describe addition information about a traffic status of the vehicle in a text form |

Referring to Table 1, the TPEG-CTT container 320 includes the CTT status component for transmitting current traffic congestion status information, the prediction CTT status component for transmitting prediction traffic congestion status information, and the additional information component including additional information or auxiliary information related to congestion and travel time information.

Figure 4A:
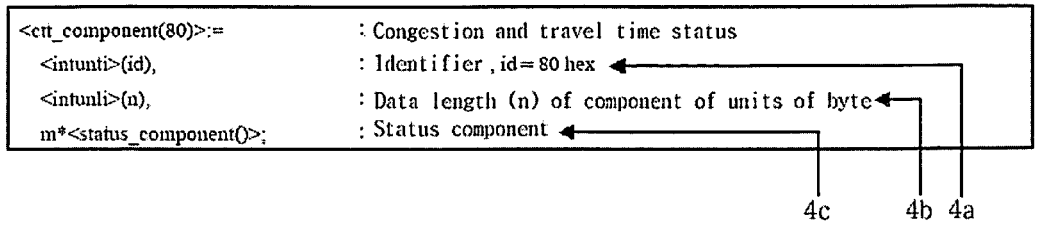
FIG. 4A illustrates a structure of a congestion and travel time status component for transmitting current traffic congestion status information according to an embodiment of the present invention.

FIG. 4A shows a structure of a CTT status component for transmitting current traffic congestion status information included in the TPEG-CTT container 322. An identifier (4a)

(id=80hex) is allocated to the CTT status component. Further, the CTT status component includes the m-number of status components, and has a field in which a total data length of the status component is expressed with units of a byte (4b). Reference numeral 4c identifies the CTT status component as a status component.

Figure 4B:
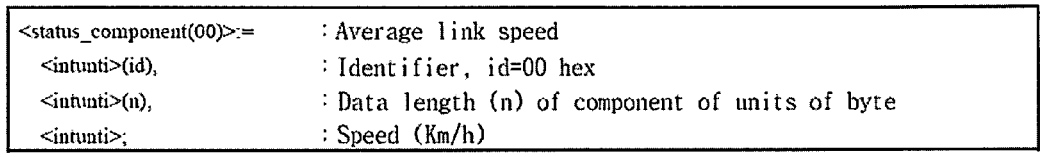
FIGS. 4B to 4E respectively illustrate current traffic congestion status information including an average link speed, a travel time, link delay, and a congestion type information format included in each status component of the congestion and travel time status component according to an embodiment of the present invention.

FIGS. 4B to 4E illustrate the status components corresponding to the current traffic congestion status information including an average link speed, a travel time, link delay and congestion type. As shown in FIG. 4B, the identifier '00' is provided in the average link speed, and (Km/h) is used as the units of the average link speed. Miles per Hour (Mph) may also be used as the average link speed.

Figure 4C:
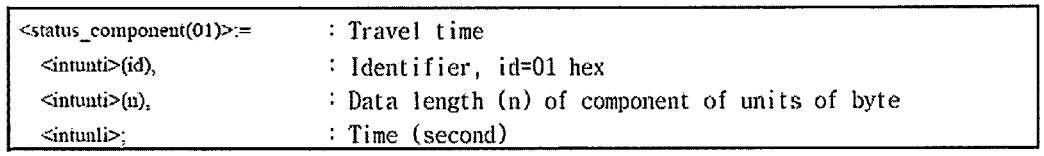
Figure 4D:
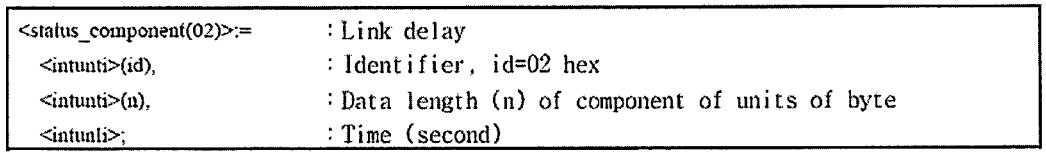
Figure 4E:
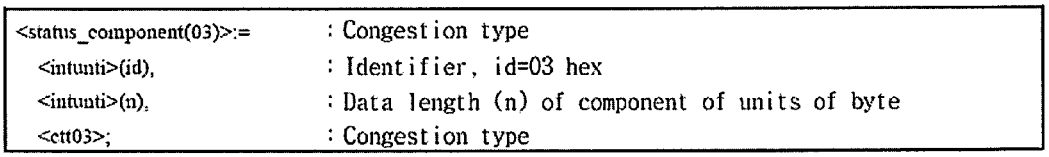

As shown in FIG. 4C, the identifier '01' is provided in the travel time, and (sec) is used as the units of travel time. In FIG. 4D, the identifier '02' is provided in the link delay, and (sec) is used with units of the link delay. In FIG. 4E, the identifier '03' is allocated to the congestion type status component.

Figure 5A:
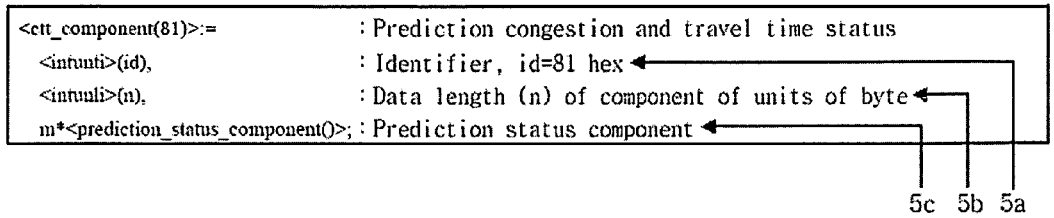
FIG. 5A illustrates a structure of a prediction congestion and travel time status component for transmitting prediction traffic congestion status information.
Figure 5B:
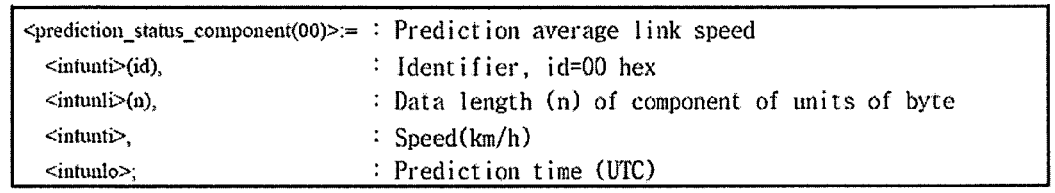
FIGS. 5B to 5E respectively illustrate a prediction average link speed, a prediction travel time, prediction congestion tendency, and an additional information format included in each status component of the congestion and travel time status component according to an embodiment of the present invention.

FIG. 5A illustrates the structure for the prediction CTT status component for transmitting prediction traffic congestion status information included in the TPEG-CTT container 320. As shown in FIG. 5A, the identifier '81h' is allocated to the prediction CTT status component for transmitting prediction information (5a). Further, a total data length of the status component is expressed in byte units (5b). The reference numeral 5c identifies the type of status component (i.e., a prediction status component).

Further, as shown in FIGS. 5B to 5E, each status component of the prediction CTT status component includes prediction traffic congestion status information such as a prediction average link speed, a prediction travel time, a congestion tendency and additional information.

As shown in FIGS. 5B to 5E, the identifier '00' is provided in the prediction average link speed, the identifier '01' is provided in the prediction travel time, the identifier '02' is provided in the congestion tendency, and the identifier '03' is provided in the addition information.

Figure 6:
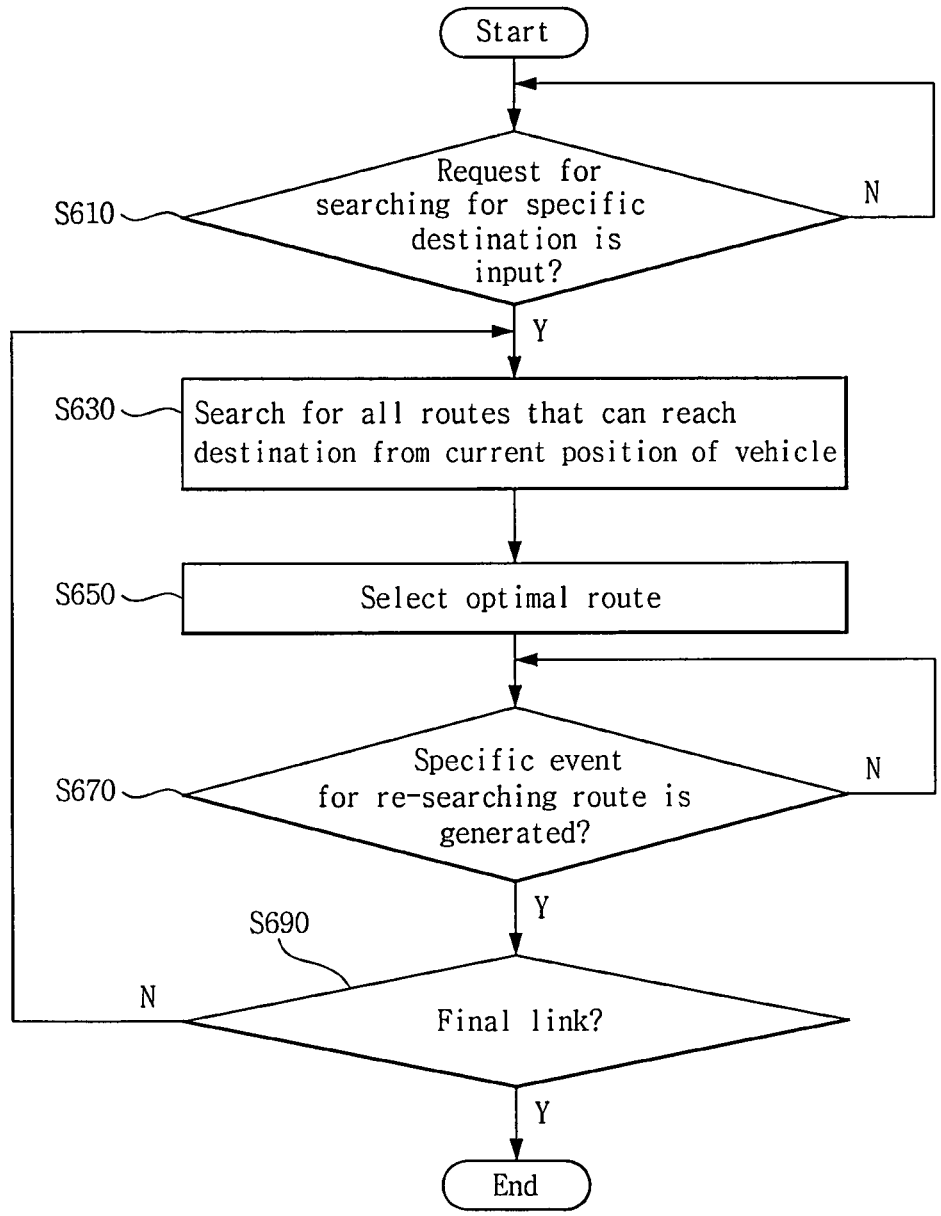
FIG. 6 is a flowchart illustrating a method of selecting a travel route according to an embodiment of the present invention.

Next, FIG. 6 is a flowchart illustrating a method of selecting an optimal route according to an embodiment of the present invention. FIG. 2 will also be referred to in this description. As shown in FIG. 6, the controller 150 determines whether the user has requested the search of a specific destination (S610). If the search request for a specific destination is input by the user (yes in S610), the controller 150 reads map data stored in the memory unit 140 and searches for all routes that can reach the destination from a current position of the vehicle 20 using a navigation message received by the GPS receiver 110 (S630).

The controller 150 selects an optimal route among the found routes using congestion traffic information extracted from the TPEG CTT message by the traffic information extraction unit 130 (S650). When the travel guide is started and the vehicle 20 moves, the controller 150 determines whether a specific event for re-searching a route is generated (S670). If a specific event for re-searching a route is generated (yes in S670), the controller 150 determines whether a road link at which the vehicle 20 is currently positioned is a final link (S690). If a road link at which the vehicle 20 is currently positioned is not a final link (No in S690), the process returns to step S630.

Figure 7:
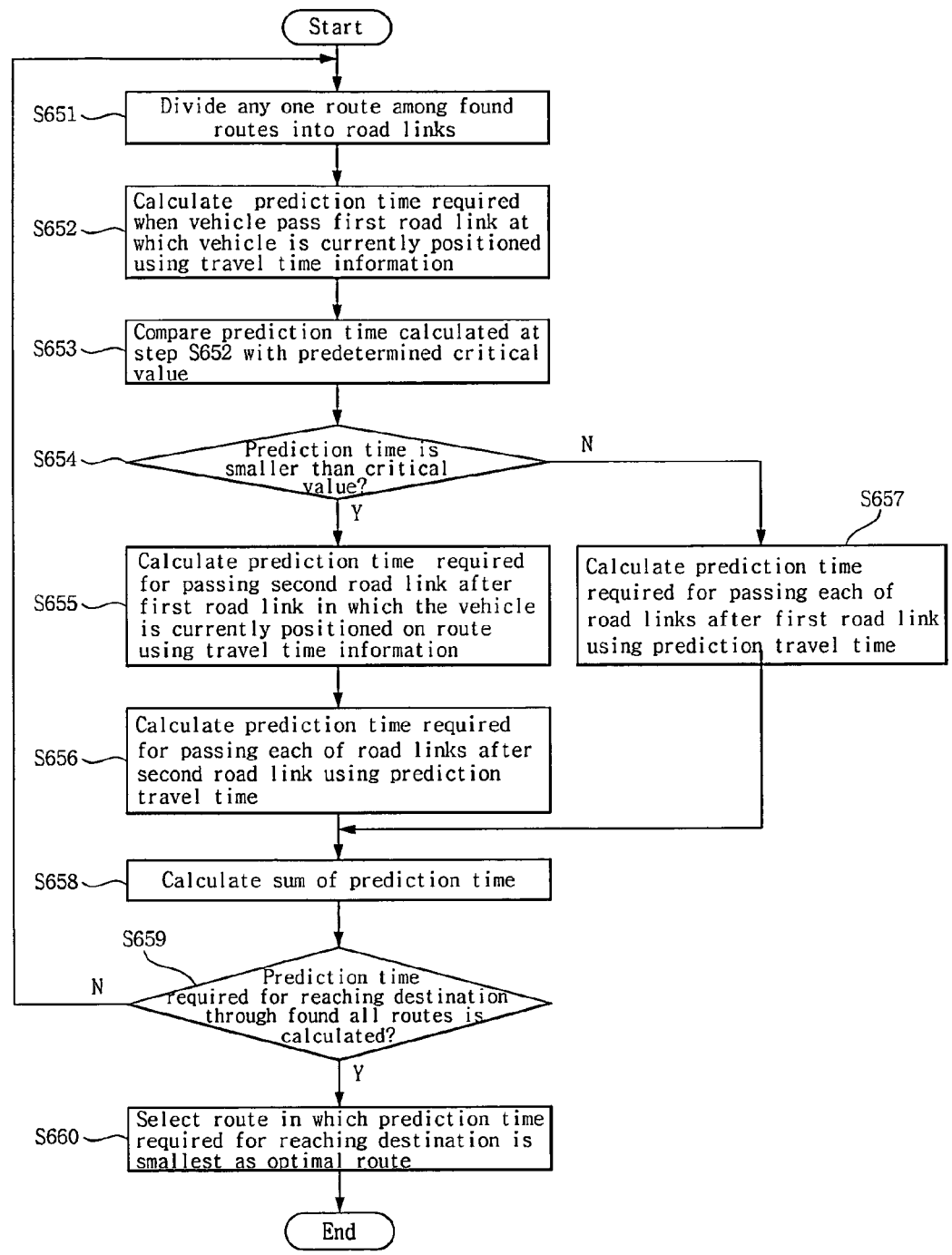
FIG. 7 is a flowchart illustrating a process of selecting an optimum route at step S650 in FIG. 6.
Figure 8:
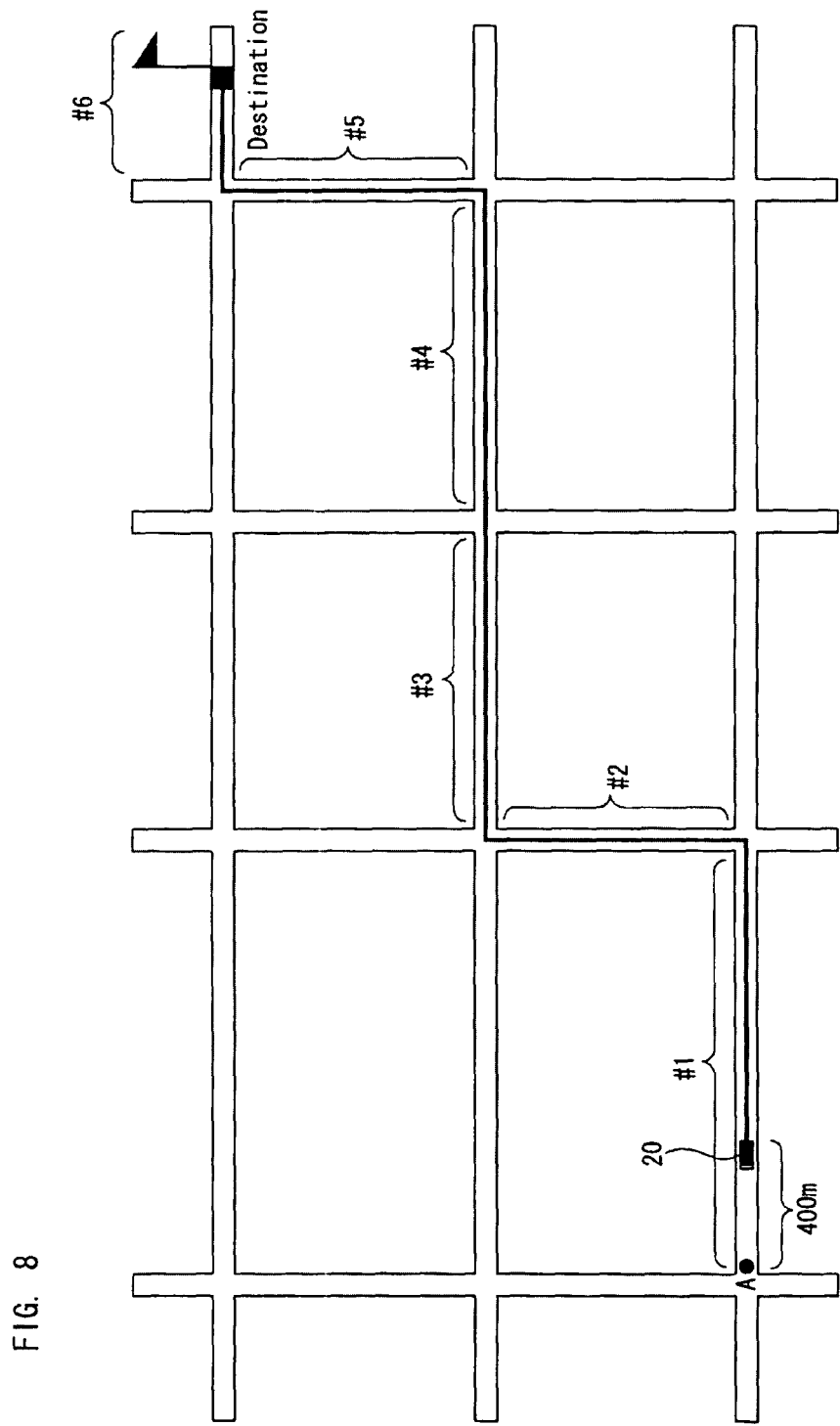
FIG. 8 is a pictorial diagram illustrating the flowchart of FIG. 7.

The process in which the controller 150 selects an optimal route among the found routes will now be described in more detail with respect to FIGS. 7 and 8. That is, FIG. 7 is a flowchart illustrating a process of selecting an optimum route at step S650 in FIG. 6, and FIG. 8 is a diagram describing the flowchart of FIG. 7. FIG. 2 will also be referred to in this description.

Referring to FIG. 7, the controller 150 divides any one route among the found routes into road links (S651). In FIG. 8, a route from a current position A of the vehicle 20 to a destination includes a first road link (#1) at which the vehicle 20 is currently positioned, and a total of 6 road links (ex: #1 to #6) to the destination.

Further, the controller 150 determines the travel time information shown in FIG. 4C by referring to the memory unit 140, and calculates a prediction time required for the vehicle 20 to pass the first road link (#1) using the determined travel time information (S652). In more detail, a prediction time required for passing the first road link (#1) from where the vehicle 20 is currently positioned can be calculated using the distance from the starting point of the first road link (#1) to a current position of the vehicle 20, a distance of the first road link (#1), and a travel time of the first road link (#1).

That is, when the travel time required for passing the first road link (#1) to which the vehicle 20 belongs is T (sec), a length of the first road link (#1) to which the vehicle 20 belongs is L (m), and the vehicle 20 is positioned at a point S (m) from the beginning point A, a prediction time required for passing the first road link (#1) from the current position of the vehicle 20 is represented by Equation 1.

$$\text{Prediction time} = T(1 - S/L). \quad \text{Equation 1}$$

In FIG. 8, when T is 12 minutes (=720 secs), L is 1200 m, and S is 400 m, the prediction time required for passing the first road link (#1) from a current position of the vehicle 20 is 720{1−(400/1200)}=480 (sec), i.e., 8 minutes.

Alternatively, the prediction time required for passing the first road link (#1) at which the vehicle 20 is currently positioned can be calculated using the travel speed information shown in FIG. 4B, a distance from the starting point of the first road link (#1) to the current position of the vehicle 20, and the travel time of the first road link (#1).

That is, when the travel time required for passing the first road link (#1) to which the vehicle 20 belongs is T (sec), the vehicle 20 is currently positioned at a point S (m) from the beginning point A, and an average link speed in the first road link (#) is B (m/s), the prediction time required for passing the first road link (#1) from the current position of the vehicle 20 is represented by Equation 2.

$$\text{Prediction time} = T - S/B. \quad \text{Equation 2}$$

Thus, when the prediction time required for passing the first road link (#1) to which the vehicle 20 currently belongs is calculated by the above-described method, the controller 150 compares the prediction time calculated at step S652 with a predetermined critical value (S653). In one embodiment, the predetermined critical value may be a period from a current time point to a time point in which a new TPEG message reaches the traffic information reception terminal 100.

In addition, the controller 150 determines whether a prediction time required for passing the first road link (#1) at which the vehicle 20 is currently positioned is smaller than a reception time of a new TPEG message (S654). If the prediction time required for passing the first road link (#1) at which the vehicle 20 is currently positioned is smaller than the reception time of a new TPEG message, i.e. if it is expected that the vehicle 20 will not receive a new TPEG message while passing the first road link (#1) (Yes in S654), the controller 150 determines a travel time of the second road link (#2) in which the vehicle 20 is to enter by referring to the memory unit 140.

That is, the controller 150 calculates a prediction time required for passing the second road link (#2) in which the vehicle 20 is to enter in a route using travel time information at a current time point (S655). In this way, if a prediction time required for passing a first road link (#1) to which the vehicle 20 currently belongs and a next road link (#2) from a current position of the vehicle 20 is calculated, the controller 150 determines prediction travel time information at a time point in which the vehicle 20 arrives in each road link of the next road links (ex: #3 to #6) referring to the memory unit 140.

The controller 150 also calculates a prediction time required for passing the road links (ex: #3 to #6) after the second road link (#2) using the confirmed prediction travel time (S656). In this instance, when the vehicle 20 arrives in each road link after the second road link, and when prediction travel time information for the corresponding road link is not stored in the memory unit 140 but only travel time information is stored in the memory unit 140, the prediction time required for passing the corresponding road link is calculated using travel time information instead of prediction travel time information.

Further, at a time point when the vehicle 20 arrives in each road link, a prediction link travel time is obtained as follows. For example, when the prediction time required for passing the first road link (#1) from a starting point is 10 minutes, and a prediction time required for passing the second road link (#2) from a starting point is 8 minutes, a prediction time required for passing the third road link (#3) from a starting point is obtained by adding a prediction time required for passing the third road link (#3) to a time point after 18 minutes (=10 minutes+8 minutes) based on a current time point.

The controller 150 also calculates the sum of a prediction time required for passing the first road link (#1) calculated at step S652, a prediction time required for passing the second road link (#2) calculated at step S655, and a prediction time required for passing the road links (ex: #3 to #6) after the second road link (#2) (S658).

If the prediction time required for passing the first road link (#1) at which the vehicle 20 is currently positioned from a current position of the vehicle 20 is not smaller than a reception time of a new TPEG message i.e. if it is expected that the vehicle 20 will receive a new TPEG message while passing the first road link (#1) (No in S654), the controller 150 determines a prediction travel time of each road link at each time point in which the vehicle 20 arrives in each of the road links (ex: #2 to #6) after the first road link (#1) by referring to the memory unit 140.

Figure 5C:
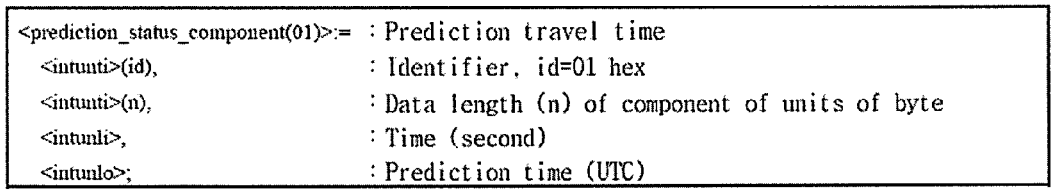
Figure 5D:
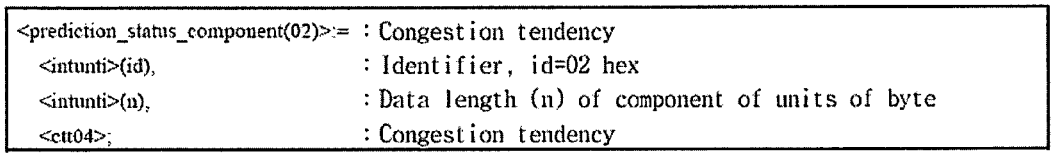
Figure 5E:
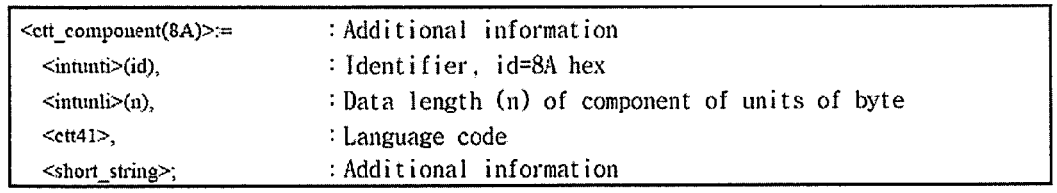

The controller 150 then calculates a prediction time required for passing each of the road links (ex: #2 to #6) after the first road link (#1) using the prediction travel time shown in FIG. 5C (S657). In this instance, at each time point in which the vehicle 20 arrives in each of the road links (ex: #2 to #6) after the first road link (#1), when prediction travel time information of the corresponding road link is not stored in the memory unit 140 and only travel time information is stored in the memory unit 140, the prediction time required for passing the corresponding road link can be calculated using the travel time information instead of the prediction travel time information.

Further, the controller 150 calculates the sum of the prediction time required for passing the first road link calculated at step S652 and the prediction time required for passing the road links (ex: #2 to #6) after the first road link calculated at step S657 (S658). If the prediction time required for reaching the destination through any one route is calculated in this way, the controller 150 calculates the prediction time required for traveling to the destination through other routes found at step S610 of FIG. 6.

In addition, the controller 150 determines whether the prediction time required for reaching the destination in respect to all routes found at step S610 of FIG. 6 is calculated (S659). If the prediction time required for reaching the destination in respect to all routes found at step S610 of FIG. 6 is calculated (Yes in S659), the controller 150 selects a route in which the prediction time required for reaching the destination is smallest as the optimal route (S660).

When the optimal route is selected in this way, the user is guided to a selected optimal route. Further, the controller 150 examines an addition information component and displays addition information or auxiliary information related to congestion and travel time information in a text form on a map.

Further, a specific event for re-searching for a route occurs when the vehicle 20 enters a new road link and/or when the traffic information reception terminal 100 receives an updated TPEG message from the broadcasting station 15. In addition, if the road link at which the vehicle 20 is currently positioned is a final link at step S690, the controller 150 does not re-search for a route. When a road link in which the vehicle 20 newly enters is a final link at which a destination is positioned, because a distance up to the destination is short, the re-searching process for another route may be unnecessary.

Figure 9:
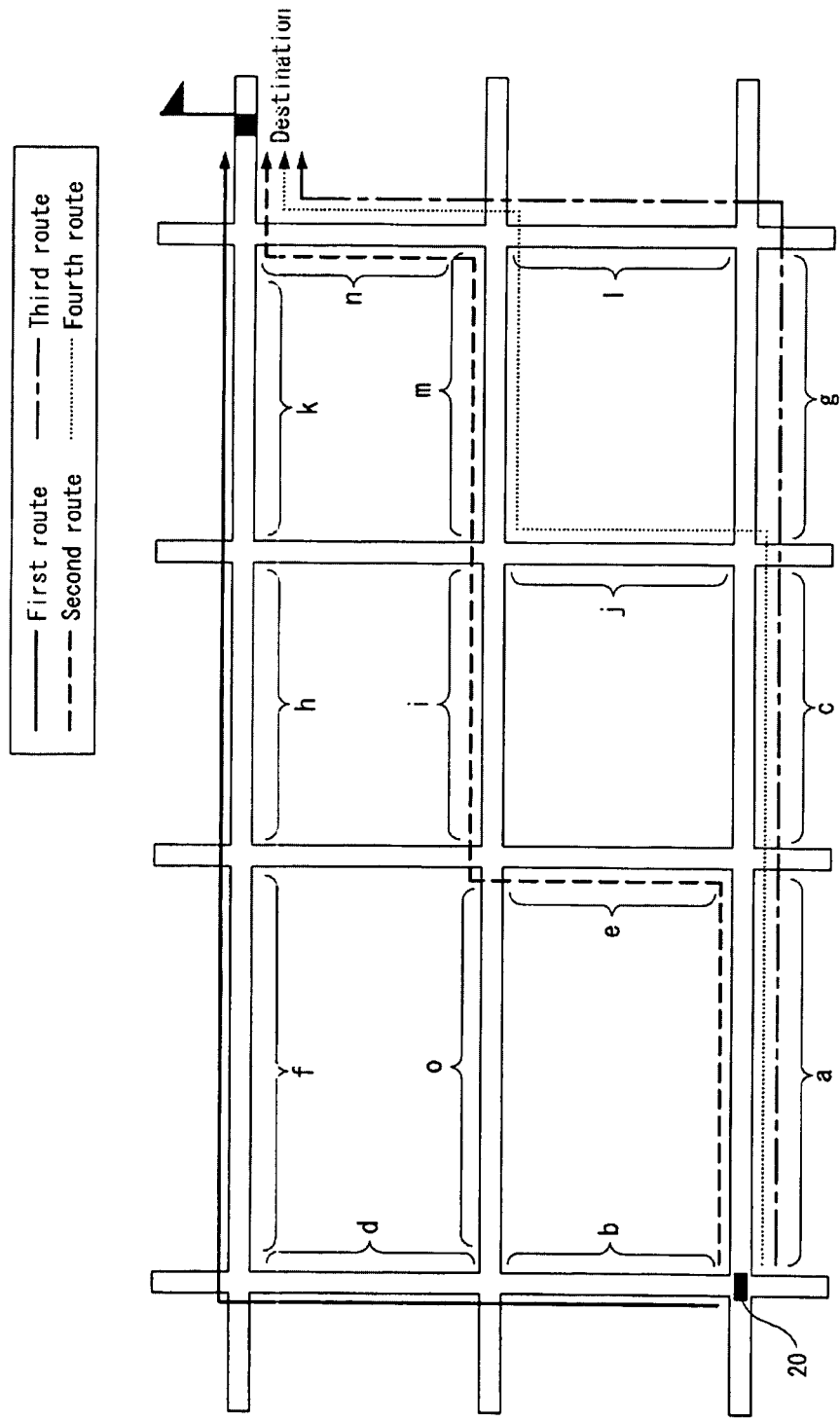
FIG. 9 is a pictorial diagram comparing a method of selecting a travel route according to an embodiment of the present invention with the related art method of selecting a travel route.

Next, FIG. 9 is a diagram comparing a method of selecting a route according to embodiments of the present invention with the related art method of selecting a route. Note that only four routes for reaching the destination from a current position of the vehicle 20 are described.

In FIG. 9, the first route is a route reaching the destination via the road links b-d-f-h-k, the second route is a route reaching the destination via the road links a-e-i-m-n, the third route is a route reaching the destination via road links a-c-g-l-n, and the fourth route is a route reaching the destination via road links a-c-j-m-n.

Table 2 shows an example of a travel time of each road link at a current time point.

TABLE 2

| Road link | Travel time |
|---|---|
| a | 10 minutes |
| b | 10 minutes |
| c | 6 minutes |
| d | 6 minutes |
| e | 7 minutes |
| f | 5 minutes |
| g | 15 minutes |
| h | 6 minutes |
| i | 7 minutes |
| j | 9 minutes |
| k | 10 minutes |
| l | 9 minutes |
| m | 10 minutes |
| n | 7 minutes |
| o | 4 minutes |

Referring to Table 2 and FIG. 9, the first route=b(10 minutes)+d(6 minutes)+f(5 minutes)+h(6 minutes)+k(10 minutes)=36 minutes. Further, the second route=a(10 minutes)+e(7 minutes)+i(7 minutes)+m(10 minutes)+n(7 minutes)=41 minutes, and the third route=a(10 minutes)+c(6 minutes)+g(15 minutes)+l(9 minutes)+m(7 minutes)=47 minutes. Also, the fourth route=a(10 minutes)+c(6 minutes)+j(9 minutes)+m(10 minutes)+n(7 minutes)=42 minutes Therefore, in the related art method, the route that has the smallest prediction time required for reaching the destination is selected as the optimal route (in this example, the first route has the smallest prediction time). However, the related art method does not take into consideration the road network and the traffic status that changes in real time as the vehicle 20 travels to the destination point.

Unlike the related art method, the present invention advantageously uses a method of selecting a route based on a travel time at a current time point and a prediction travel time at a time point reaching each road link. That is, the present invention advantageously uses the following calculation.

Table 3 shows an example of a prediction travel time at a time point reaching each road link. In this example, at the first road links a and b, because the travel time is applied based on a current time point, a prediction travel time corresponding to road links a and b in Table 3 is omitted.

TABLE 3

| Road link | Prediction travel time |
| --- | --- |
| c | 6 minutes after 10 minutes |
| d | 10 minutes after 10 minutes |
| e | 8 minutes after 10 minutes |
| f | 14 minutes after 20 minutes |
| g | 10 minutes after 16 minutes |
| h | 9 minutes after 34 minutes |
| i | 8 minutes after 18 minutes |
| j | 11 minutes after 16 minutes |
| k | 5 minutes after 43 minutes |
| l | 7 minutes after 26 minutes |
| m | 4 minutes after 26 minutes |
|   | 5 minutes after 27 minutes |
| n | 5 minutes after 30 minutes |
|   | 7 minutes after 32 minutes |
|   | 8 minutes after 33 minutes |
| o | 8 minutes after 10 minutes |

Further, the travel time shown in Table 1 is applied to the first road links a or b and a prediction travel time at a time point reaching each of the other road links is applied to each of the other road links. Also, at the road link to which the destination belongs, because a time required for reaching the destination is identical regardless of routes, a time required for reaching the destination from a starting point of a road link to which the destination belongs is excluded.

The first route=b(10 minutes)+d(10 minutes after 10 minutes)+f(14 minutes after 20 minutes)+h(9 minutes after 34 minutes)+k(5 minutes after 43 minutes)=48 minutes. The second route=a(10 minutes)+e(8 minutes after 10 minutes)+i(8 minutes after 18 minutes)+m(4 minutes after 26 minutes)+n(5 minutes after 30 minutes)=35 minutes, and the third route=a(10 minutes)+c(6 minutes after 10 minutes)+g(10 minutes after 16 minutes)+l(7 minutes after 26 minutes)+n(8 minutes after 33 minutes)=41 minutes. Also, the fourth route=a(10 minutes)+c(6 minutes after 10 minutes)+j(11 minutes after 16 minutes)+m(5 minutes after 27 minutes)+n(7 minutes after 32 minutes)=39 minutes.

That is, the method of selecting a route according to embodiments of the present invention applies both a travel time, which is current traffic congestion status information and a prediction travel time, which is prediction traffic congestion status information. Therefore, in this example, the second route is selected as an optimal route.

Accordingly, by using current traffic congestion status information and prediction traffic congestion status information, a road network and a traffic status changing in a real time when the vehicle 20 moves can be reflected. Thus, an optimum travel guide service can be provided.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A method of selecting a travel route using a navigation terminal, the method comprising:
receiving broadcasting signals by the navigation terminal;
extracting message information formed in a hierarchical structure and including traffic information from the received broadcasting signals, the traffic information including current traffic congestion status information and prediction traffic congestion status information;
inputting a first position value and a second position value corresponding to first and second positions;
searching for travel routes between the first and second positions;
dividing the travel routes from the first position to the second position into a plurality of individual road links;
calculating a time required to travel each road link along the travel routes from the first position to the second position based on at least one of the current traffic congestion status information and the prediction traffic congestion status information, the prediction congestion status information including a prediction average link speed, a prediction travel time, a congestion tendency and additional information for each road link;
calculating a total time required to travel all of the road links for the travel routes from the first position to the second position; and
selecting, via a controller on the navigation terminal and without user interaction, a travel route that has a smallest total amount of time to travel from the first position to the second position among the calculated travel routes,
wherein a particular time required to travel a particular road link among the plurality of individual road links is estimated using the prediction traffic congestion status information at a future time,
wherein the future time is calculated by adding the calculated time required to travel each road link from the first position to a road link immediately before the particular road link along the travel routes from the first position to the second position, and
wherein calculating the time required to travel each road link calculates a prediction time of a first road link belonging to the first position using the current traffic congestion status information and calculates a prediction time of other road links along the travel routes using the prediction traffic congestion status information.

2. The method of claim 1, wherein the first position is a current position or a starting point of a vehicle that is going to travel from the first position to the second position.

3. The method of claim 1, wherein the second position is a destination point that a vehicle is going to.

4. The method of claim 1, wherein the message information formed in the hierarchical structure is a Transport Protocol Expert Group (TPEG) message, the current traffic congestion status information includes travel time information, and the prediction traffic congestion status information includes prediction travel time information.

5. The method of claim 1, further comprising:
determining if a specific event has occurred; and
re-searching for travel routes between the first and second positions when the determining step determines the specific event has occurred.

6. The method of claim 5, wherein determining step determines the specific event has occurred when traveling into a new road link and when receiving updated message information.

7. The method of claim 1, further comprising:
determining if new message information is going to be received before traveling through a first road link to which the first position belongs.

8. The method of claim 7, further comprising:
calculating a prediction time required for passing the first road link and a second road link directly connected to the first road link using the current traffic congestion status information, when the determining step determines the new message information is not going to be received before traveling through the first road link.

9. The method of claim 7, further comprising:
calculating a prediction time required for passing remaining road links except the first and second road links using the prediction traffic congestion status information, when the determining step determines the new message information is not going to be received before traveling through the first road link.

10. The method of claim 7, further comprising:
calculating a prediction time required for passing remaining road links except the first road link using the prediction traffic congestion status information, when the determining step determines the new message information is going to be received before traveling through the first road link.

11. A navigation terminal, comprising:
a receiving unit configured to receive broadcasting signals;
an input unit configured to receive a first position value and a second position value corresponding to first and second positions; and
a control unit configured to extract message information formed in a hierarchical structure and including traffic information from the received broadcasting signals, the traffic information including current traffic congestion status information and prediction traffic congestion status information, to search for travel routes between the first and second positions, to divide the travel routes from the first position to the second position into a plurality of individual road links, to calculate a time required to travel each road link along the travel routes from the first position to the second position based on at least one of the current traffic congestion status information and the prediction traffic congestion status information, the prediction congestion status information including a prediction average link speed, a prediction travel time, a congestion tendency and additional information for each road link, to calculate a total time required to travel all of the road links for the travel routes from the first position to the second position, and to select without user interaction a travel route that has a smallest total amount of time to travel from the first position to the second position among the calculated travel routes,
wherein the control unit is further configured to estimate a particular time required to travel a particular road link among the plurality of individual road links using the prediction traffic congestion status information at a future time, and to calculate the future time by adding the calculated time required to travel each road link from the first position to a road link immediately before the particular road link along the travel routes from the first position to the second position, and
wherein the control unit is further configured to calculate a prediction time of a first road link belonging to the first position using the current traffic congestion status information, and to calculate a prediction time of other road links along the travel routes using the prediction traffic congestion status information.

12. The navigation terminal of claim 11, wherein the first position is a current position or a starting point of a vehicle that is going to travel from the first position to the second position.

13. The navigation terminal of claim 11, wherein the second position is a destination point that a vehicle is going to.

14. The navigation terminal of claim 11, wherein the message information formed in the hierarchical structure is a Transport Protocol Expert Group (TPEG) message, the current traffic congestion status information includes travel time information, and the prediction traffic congestion status information includes prediction travel time information.

15. The navigation terminal of claim 11, wherein the control unit is further configured to determine if new message information is going to be received before traveling through a first road link to which the first position belongs.

16. The navigation terminal of claim 15, wherein the control unit is further configured to calculate a prediction time required for passing the first road link and a second road link directly connected to the first road link using the current traffic congestion status information, when the determining step determines the new message information is not going to be received before traveling through the first road link.

17. The navigation terminal of claim 15, wherein the control unit is further configured to calculate a prediction time required for passing remaining road links except the first and second road links using the prediction traffic congestion status information, when the determining step determines the new message information is not going to be received before traveling through the first road link.

18. The navigation terminal of claim 15, wherein the control unit is further configured to calculate a prediction time required for passing remaining road links except the first road link using the prediction traffic congestion status information, when the determining step determines the new message information is going to be received before traveling through the first road link.

19. The navigation terminal of claim 15, wherein the control unit is further configured to determine if a specific event has occurred, and to re-search for travel routes between the first and second positions when the determining step determines the specific event has occurred.

20. The navigation terminal of claim 19, wherein the control unit is further configured to determine the specific event has occurred when traveling into a new road link and when receiving updated message information.

* * * * *